May 6, 1947.    W. K. COBURN    2,420,227
NEPHOSCOPE
Filed March 2, 1946    3 Sheets-Sheet 1
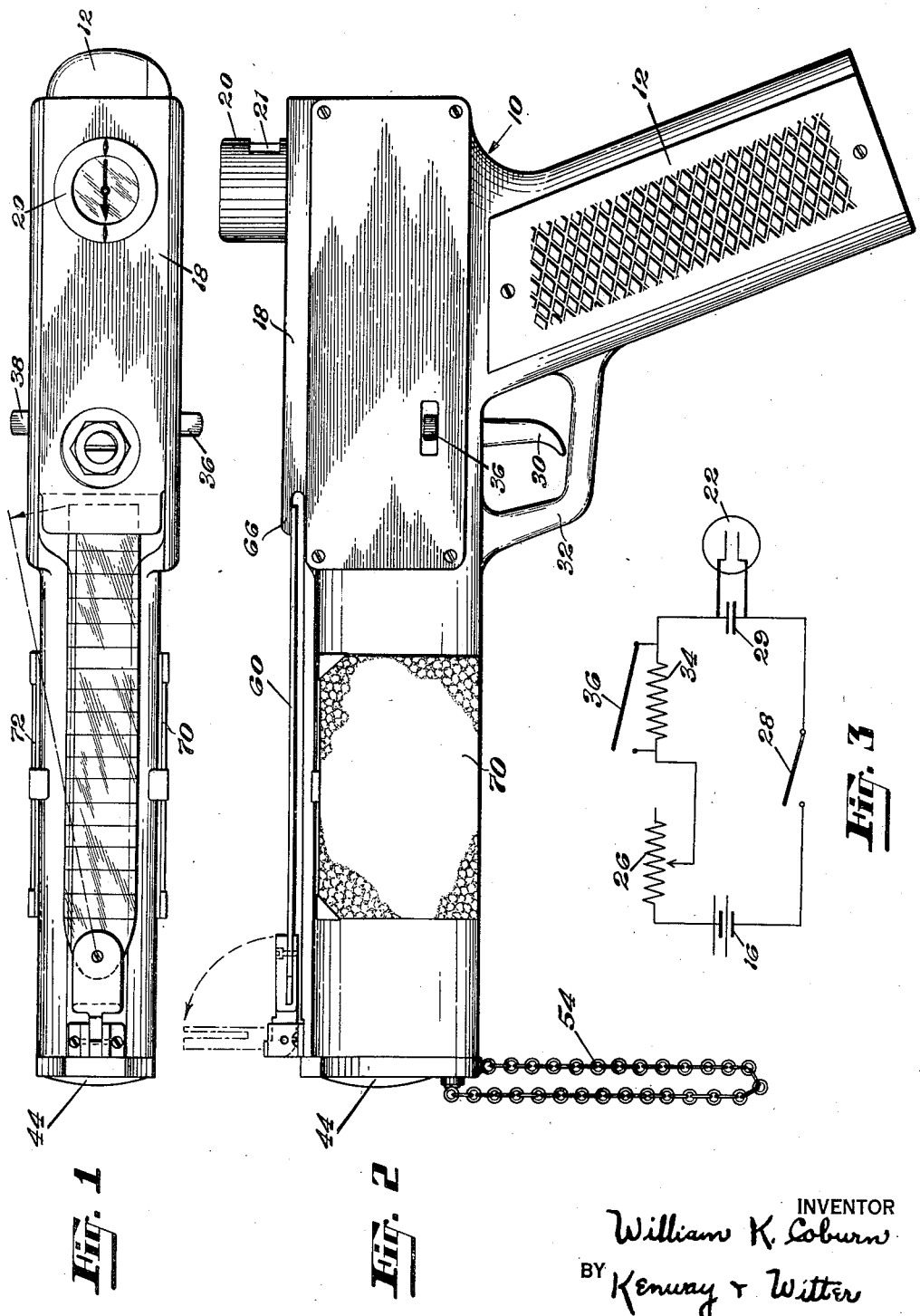
INVENTOR
William K. Coburn
BY Kenway & Witter
ATTORNEY May 6, 1947.　　　　W. K. COBURN　　　　2,420,227
NEPHOSCOPE
Filed March 2, 1946　　　3 Sheets-Sheet 2
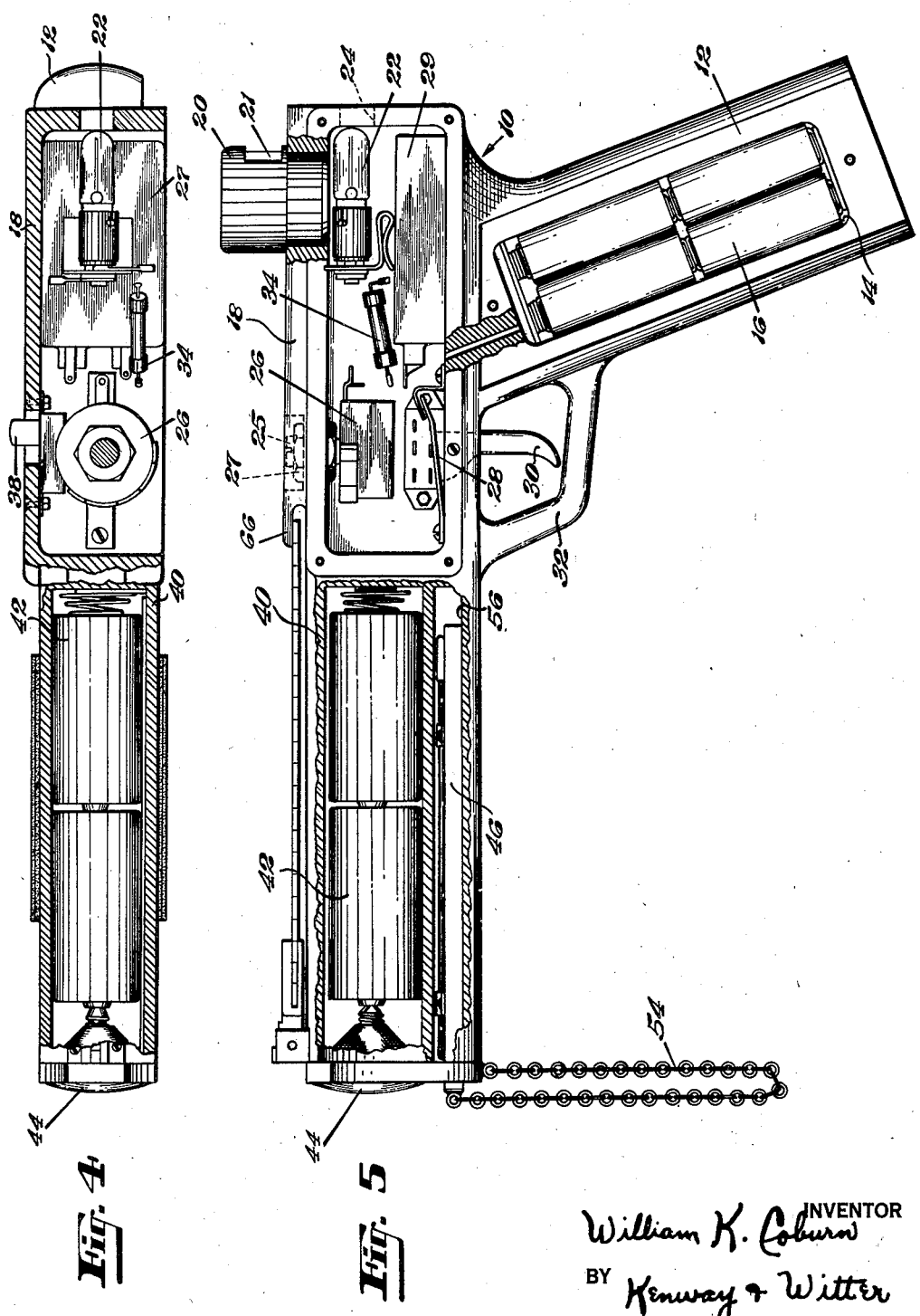

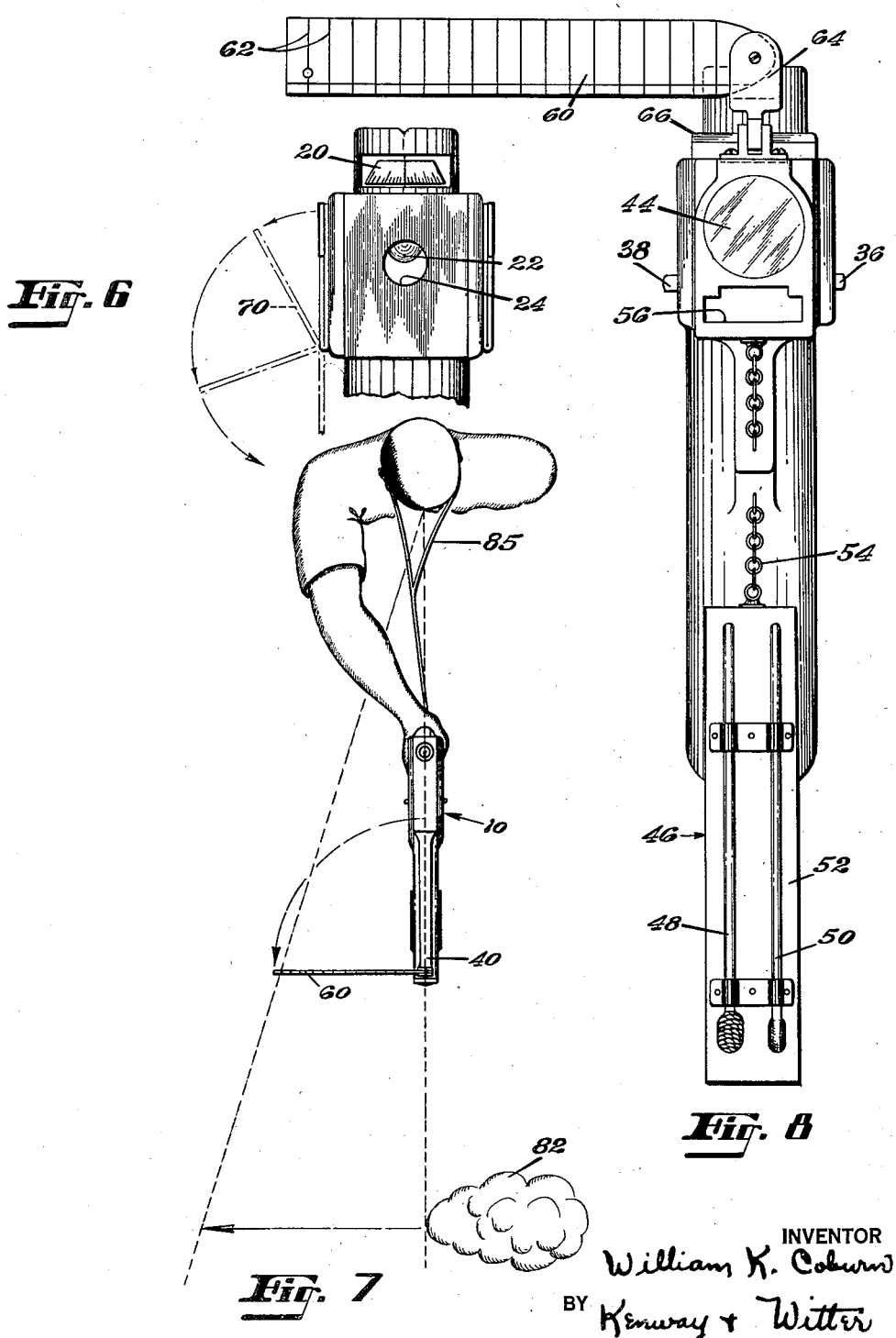

Patented May 6, 1947

2,420,227

UNITED STATES PATENT OFFICE 2,420,227

NEPHOSCOPE

William Knowlton Coburn, Cambridge, Mass., assignor to Serdex, Inc., Boston, Mass., a corporation of Massachusetts Application March 2, 1946, Serial No. 651,661

4 Claims. (Cl. 161—18)

My invention relates to meteorology and meteorological instruments. More particularly, the invention comprises a nephoscope, that is to say, an instrument useful in gathering data with respect to cloud movement and altitudes.

It often happens that atmospheric conditions aloft differ markedly from those at the ground and that a comparison of the two will result in information extremely useful in predicting future weather conditions. Hitherto meteorological instruments for ascertaining this type of information have been objectionably bulky and require highly trained personnel for their successful operation.

The most important object of my invention is to provide a small, light nephoscope capable of use by ordinarily intelligent persons without particular training in meteorology.

Another object of the invention is to combine in one easily portable instrument means for determining with accuracy such data concerning atmospheric conditions as cloud height, cloud velocity and direction of travel, wind direction, air temperature, and dew point.

An important feature of the invention resides in a pistol-shaped handle or support upon which is mounted a folding sighting scale and a timing device arranged to produce a series of impulses at uniform intervals. The operator may time the progress of a cloud of known altitude across the scale, and obtain from tables attached to the instrument the velocity of the cloud.

The nephoscope of my invention is not only a valuable instrument for professional meteorologists but by reason of its compactness and light weight and ease of operation may be used to considerable advantage by woodsmen, yachtsmen, aviators, etc.

The several objects and features of my invention will be more readily understood and appreciated from the following detailed description of a preferred embodiment thereof selected for purposes of illustration and shown in the accompanying drawings, in which:

Fig. 1 is a plan view of a nephoscope constructed in accordance with my invention, Fig. 2 is a view in side elevation, Fig. 3 is a schematic wiring diagram, Fig. 4 is a view in longitudinal cross-section through the upper portion of the nephoscope, Fig. 5 is a view in side elevation with portions broken away to show the construction, Fig. 6 is a fragmentary view in end elevation from the rear of the nephoscope, Fig. 7 is a diagrammatic view illustrating the use of the nephoscope, and Fig. 8 is a view in front elevation.

In the preferred form of the invention shown in the drawings, the nephoscope is organized about a handle or support 10 shaped very much like a large automatic pistol and made of metal, plastic, wood, or any other suitable material. I prefer to mold the handle from a plastic since it saves weight to do so. The pistol 10 has a hand grip portion 12 provided with an internal chamber 14 in which four batteries 16 are disposed. The breech is formed by a hollow casing 18 integral with the grip 12 and supporting adjacent its rear end a small compass 20.

Within the casing 18 is mounted a timer which, in the form shown in the drawing, comprises a simple glow tube relaxation oscillator. The circuit is shown in Fig. 3 and will be recognized by those skilled in the art as a conventional oscillator circuit deriving its power from the batteries 16 contained in the grip 12. A small neon glow tube or bulb 22 is mounted within the casing 18 in line with a small hole 24 formed in the rear of the casing beneath the compass 20. A condenser 29 is contained in the casing 18 disposed beneath the neon tube 22, and a potentiometer 26 is secured to the breech casing 18 beneath the upper wall thereof which is apertured to receive the potentiometer shaft 25. The latter is slotted at the top so that the potentiometer may be adjusted by a screw driver. The pistol 10 is provided with a trigger 30 and a trigger guard 32 of conventional form. The trigger 30 operates two switches disposed within the breech casing 18. One of the switches 28 controls the oscillator circuit. A resistor 34 is also mounted within the breech casing 18 and connected into the circuit of the oscillator, as shown in Fig. 3. A switch controlled by a button 36 projecting through the side of the breech casing 18 is connected across the resistor 34 so that the latter is normally shunted through the switch.

When the switch 28 is closed, the condenser 29 will first become charged through the potentiometer 26 until its voltage equals the discharge voltage of the neon bulb 22. The condenser then discharges through the bulb and produces a visible flash. The timing of the flashes depends upon the values of the condenser and the potentiometer and can be adjusted by manipulation of the shaft 25. The adjustment will preferably be such that the bulb will flash once every second. While the circuit as shown is simple and efficient, it is only representative of any one of a large number of types of oscillators which could be employed; a vacuum tube oscillator or a clockwork mechanism might also be used. Moreover, the type of impulse used is not critical, and an audible signal might be substituted for the visible flash.

The switch 36 and the resistor 34 are provided to make it possible for the operator to check the condition of the batteries 16 which supply the power for the oscillator circuit. After a long period of use, the output of the batteries will be reduced and such reduction will eventually result in changing the time constant of the oscillator circuit. The value of the resistor 34 is such that when the switch 36 is open, the potentiometer at zero, and the trigger 30 is pulled, the oscillator will not produce a flash unless the batteries 16 are supplying a voltage high enough to produce flashes at the proper frequency. When this takes place, the batteries should be replaced.

The pistol 10 is provided with a barrel portion 40 which serves as the casing for a flashlight including a pair of conventional flashlight cells 42 and a lens 44 set into the end of the barrel 40. The electric circuit for the flashlight includes the cells 42, a switch 38 mounted in the breech 18, and a second switch (not shown) connected in series with the switch 38 and controlled by the trigger 30. When the switch 38 is opened, movement of the trigger 30 has no effect on the flashlight, but when the switch 38 is closed, the trigger 30 controls the flashlight which may be used as a blinker gun or signalling lamp.

The bottom portion of the barrel 40 is recessed as shown at 56 to receive a sling psychrometer 46 which comprises a wet bulb thermometer 48 and a dry bulb thermometer 50, both mounted on a flat support 52 and fastened to the end of the barrel 40 by means of a chain 54. When it is desired to take a reading from the psychrometer, it is removed from the recess 56, and the operator swings the handle in an arc which whirls the psychrometer 46 through the air. It is then possible to obtain both dry bulb and wet bulb readings.

A flat transparent sighting scale 60 provided with transverse markings 62 to define tenths of the entire length of the scale is pivotally mounted on an ear 64 which in turn is pivotally mounted on the end of the barrel 40. The scale 60 is rigid and may be swung about the ear 64 and folded flat on the top of the barrel 40 where it is held underneath a shoulder 66 formed at the rear of the barrel 40. Also the scale may be revolved and extended at right angles to the barrel 40 as shown clearly in Fig. 7.

The sling psychrometer 46 is used in the conventional manner to obtain air temperature and wet bulb temperature readings. Along one side of the barrel 40 I secure a folding case 70 to the inside of which is secured a chart (not shown) which gives dew point values for various values of air temperature and wet bulb temperature. I may also include in the chart a table for finding relative humidity. The compass 20 is used to determine wind direction both at the ground and aloft.

The altitude of the base of cumulus or cumiliform clouds lies at the intersection of lines representing the dry adiabatic rate and the dew point lapse rate, and corresponds to the following equation:

$$h = \frac{1000(t_1 - t_2)}{4.2}$$

$$= 238.1(t_1 - t_2)$$

in which $t_1$ is dry bulb temperature and $t_2$ is wet bulb temperature. I therefore provide a second chart from which the cloud base altitude can be determined after the difference between $t_1$ and $t_2$ has been ascertained from the psychrometer 46. This chart is a simple graph of temperature difference plotted against altitude and may also be enclosed in the case 70.

With the foregoing information at hand, the nephoscope can be used to determine cloud velocity, and thereby the velocity of wind aloft. For this purpose I provide a sling 85 fastened to the butt of the handle 10 and providing a loop adapted to go around the neck of the operator. To determine the velocity of the cloud, that is a cumiliform cloud, the operator slips the loop 85 over his head and then taking hold of the handle 10 by the grip 12 extends it directly over his head toward the zenith. When a cloud approaches either end of the scale the operator pushes the trigger 30, which sets the oscillator in operation, and then counts the number of flashes to determine the time it takes the cloud to traverse the whole or any selected portion of the length of the sighting scale 60. I provide another chart, or table, including an ordinate graduated in terms of altitude, an abscissa graduated in time, and a series of velocity lines extending from the origin. This chart may be enclosed in a second folding casing 72 attached to the barrel 40 on the side opposite the chart casing 70. The graduations representing time are of course related to the length of the scale 60. Consequently the operator is enabled to determine the velocity of the cloud. The sling 85 provides means for fixing the distance between the observer's eye and the sighting scale 60. Variation in this distance will effect the accuracy of the instrument, although it should be pointed out that the operator may sight at a cloud which is moving to one side or the other of the vertical provided the angle between the cloud and the vertical is not substantially more than 15°. Fig. 7 illustrates the use of the nephoscope for obtaining the velocity of a cloud 82. The figure is, necessarily, out of proportion.

By using the nephoscope at intervals, the operator may observe changes in the atmospheric conditions which may be correlated according to well-known principles and make it possible to predict future weather conditions. The entire instrument is small and compact, easily stowed, and of little weight. It thus lends itself well to inclusion as equipment on yachts, camping expeditions, etc. Furthermore it can be cheaply built to provide amateur meteorologists with a practical and useable instrument at comparatively low cost.

Various changes and modifications will suggest themselves. Although the pistol-shaped handle is quite convenient, its shape is not critical. Another convenient shape would be that of the standard Navy blinker gun. As previously stated, any suitable method or apparatus for obtaining

Having now described and illustrated one preferred form of the invention what I claim as new and desire to secure by Letters Patent of the United States is:

1. Nephoscope which comprises an elongated handle of pistol-shape, a rigid scale pivotally secured to said handle adjacent the barrel end and arranged either to be folded flat against said handle or to be extended at a predetermined angle thereto, a glow discharge tube secured in said handle adjacent the grip end thereof and arranged to be visible simultaneously with the extended scale, an oscillating circuit having elements thereof secured within said handle and including said glow discharge tube, and means for controlling said oscillating circuit.

2. Nephoscope comprising an elongated handle of pistol-shape having a trigger adjacent the grip end thereof, a rigid scale secured to said handle adjacent the other end thereof to extend at a predetermined angle thereto, a glow discharge oscillator within said handle adjacent the grip end thereof and arranged to be visible simultaneously with the extended scale, and a switch controlling said oscillator and actuated by said trigger.

3. Nephoscope comprising an elongated handle of pistol-shape having a trigger adjacent the grip end thereof, a rigid scale secured to said handle adjacent the other end thereof to extend at a predetermined angle thereto, and means mounted on said handle and controlled by said trigger for producing a series of timed impulses, said impulses being observable simultaneously with the extended scale.

4. Nephoscope which comprises an elongated handle of pistol-shape having a trigger adjacent the grip end thereof, a rigid scale pivotally secured to said handle adjacent the barrel end thereof and arranged either to be folded flat against said handle or to be extended at a predetermined angle thereto, means mounted in said handle adjacent the grip end thereof and controlled by said trigger for producing a series of visible timed impulses, said impulses being observable simultaneously with the extended scale, and means secured to said handle for fixing the distance between said scale and the eye of an operator.

WILLIAM KNOWLTON COBURN.

REFERENCES CITED

The following references are of record in the file of this patent:

UNITED STATES PATENTS

| Number | Name | Date |
| --- | --- | --- |
| 1,535,421 | Jones | Apr. 28, 1925 |
| 2,088,478 | Kovalsky | July 27, 1937 |